Figure 1:
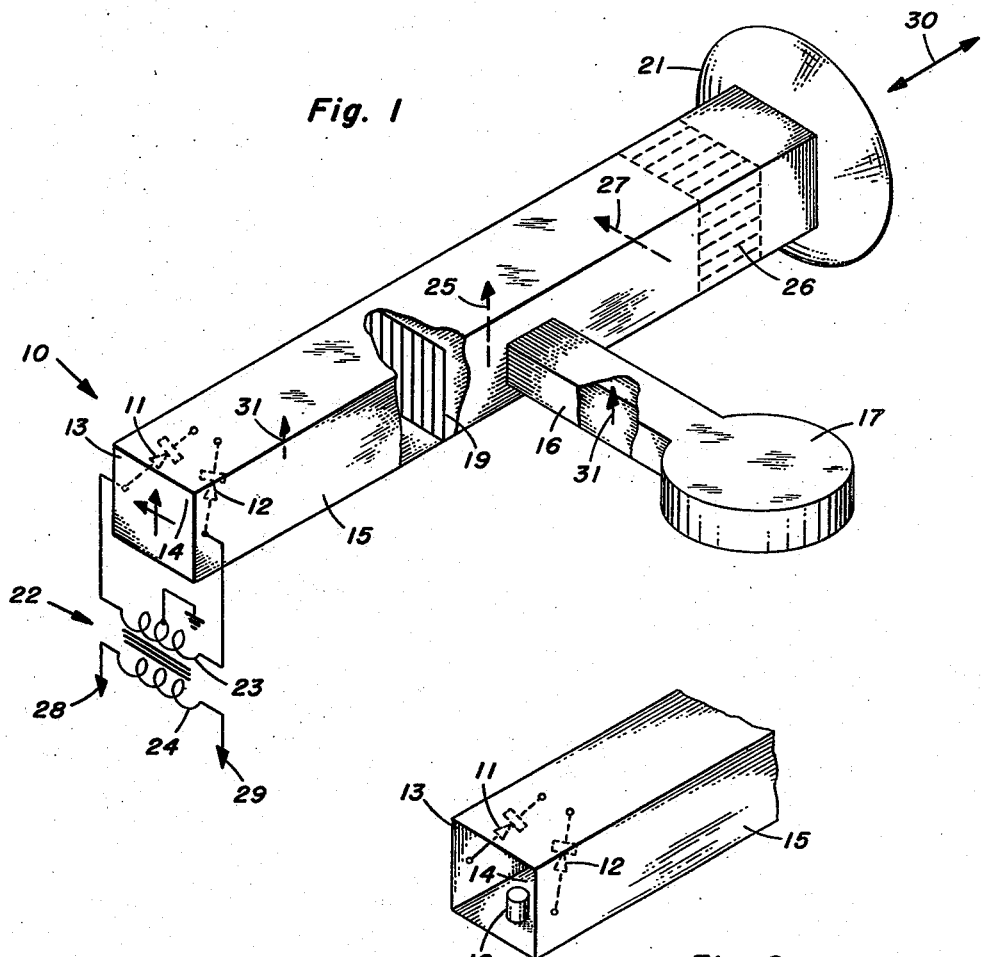

Oct. 22, 1957     D. BLITZ     2,810,904
BALANCED DETECTOR
Filed Feb. 9, 1955

INVENTOR
DANIEL BLITZ

BY

ATTORNEYS

2,810,904
BALANCED DETECTOR

Daniel Blitz, Boston, Mass., assignor, by mesne assignments, to the United States of America as represented by the Secretary of the Navy Application February 9, 1955, Serial No. 487,225

12 Claims. (Cl. 343—5)

This invention relates generally to balanced detector apparatus and more particularly relates to a balanced detector system especially applicable in waveguides of small physical dimensions.

Prior art devices teach the use in ultra-high frequency systems of a crystal detector or similar element having the non-linear characteristics of a detecting element, incorporated in a tunable section of transmission line in such a way that the detector may be positioned at the most favorable point of the tuned line section and further teach tapping of the tunable section of transmission line at a low impedance point for the efficient abstraction of the full range of video frequency currents. In addition, arrangements have been proposed to decrease capacitive shunt impedances which degrade or deform the contour of energy pulses and complex waves. Development has been effected of tubular type crystal detectors employing silicon crystals, having a knife edge for contact with a tungsten "catwhisker" for high signal-to-noise characteristics and uniform operation at the superhigh frequencies employed in waveguide transmission systems. The crystal may be supported transversely within the waveguide by a threaded clamping cap which provides electrical contact between one terminal of the tubular crystal detector and one of the waveguide walls. It is customary to couple the other terminal of the tubular crystal detector to the opposite waveguide wall through a fixed capacitor. Modulation frequency currents are derived from the latter detector terminal while the microwave signal components are effectively transmitted through the capacitor to the waveguide wall. Because of considerable attenuation of microwave signal components by the capacitor support structure, additional integral capacitive means have been provided to reduce attenuation of microwave signal components and these means have been proportioned to provide an anti-resonant cavity which offers relatively high attenuation to microwave signal components and relatively low attenuation to modulation signal components derived from the detector.

The instant invention proposes that spurious amplitude variations sometimes present in the magnetron's output can be eliminated in the feedthrough to the receiving circuit by using two crystal detectors set on opposite sides of the waveguide and connected to cancel the amplitude variations of the feedthrough. Dimensions of waveguides such as the X-band waveguide are so small that this scheme has not been feasible prior to the advent of satisfactory circular polarization systems and the attendant use of square waveguides. The inventive system has been successful in reducing magnetron amplitude interference by 40 db (decibels), which is much greater than the 15 db peaks of the usual noise bursts and thus has overcome disadvantages of spurious amplitude variations and magnetron amplitude interference which disadvantages are inherent in prior art systems.

Accordingly, one object of the invention is to substantially reduce magnetron amplitude interference in apparatus using waveguide transmission.

Another object of the invention is to substantially eliminate spurious amplitude variations present in the output of a magnetron.

Another object of the invention is to substantially reduce the effect of spurious amplitude variations sometimes present in the output of an ultra-high or super-high frequency oscillator.

Another purpose of the invention is to eliminate spurious amplitude variations present in a magnetron's output in the feedthrough to a receiving circuit by use of a plurality of crystal detectors set on opposing sides of a waveguide and connected to cancel amplitude variations of the feedthrough.

Another aim of the invention is to eliminate spurious amplitude variations present in a magnetron's output and to reduce magnetron amplitude interference in small dimensional waveguides such as in waveguides of square cross-sectional configuration used in X-band frequencies by using two crystal detectors set on opposite sides of the waveguide and connected to cancel the amplitude variations of the feedthrough as in the feedthrough to a receiving circuit.

Figure 2:
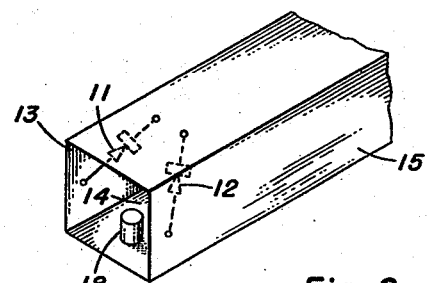

Other objects and many of the attendant advantages of this invention will be readily appreciated as the same becomes better understood by reference to the following detailed description when considered in connection with the accompanying drawings wherein:

Fig. 1 is a partially diagrammatic and partially schematic representation of a circular polarization system employing a waveguide of square cross-sectional configuration and wherein is shown an illustrative embodiment of the balanced detector system of the invention, and, Fig. 2 is an isometric view of a portion of the waveguide of Fig. 1 and showing the spatial relationship of the crystal detectors and the tuning stud of the illustrative embodiment of the invention.

Referring to the drawing and in particular to Fig. 1, a balanced detector generally designated as 10 may comprise two crystal arms 11 and 12 set on adjacent 45° corners 13 and 14 of the square waveguide 15 beyond the magnetron input arm 16 of magnetron 17. A tuning stud 18 may be mounted opposite the two crystal holders (not shown) of crystal arms 11 and 12 to match the reactance of the crystals. A set of slats 19 may be set in waveguide 15 between the balanced detector 10 and the magnetron input arm 16 to allow only a small part of the magnetron power of magnetron 17 to reach the crystals 11 and 12. As hereinafter described, slats 19 act as a short to the plane of polarization of the magnetron power. The signal returning to the antenna 21 from the target (not shown) is polarized in the opposite plane and passes slats 19 without attenuation. The crystal arms 11 and 12 may be connected to respective opposite ends of the primary 23 of a transformer generally designated at 22 which has a center tap (not numbered) to ground. Amplitude variations in the feedthrough signal are therefore detected in a push-push fashion and cancel each other. The returning doppler signal, after beating with the feedthrough, is detected in push-pull fashion and generates a signal on the secondary 24 of transformer 22.

Operation of the system shown by way of illustration of the principles of the invention is as follows: On firing of the magnetron 17 energy is transmitted from magnetic input arm 16. The magnetron power output vector may be vertically polarized as represented by arrow 25. The energy passes through circular polarizer and depolarizer unit 26 and the resulting circularly polarized signal is ejected or transmitted from antenna 21 and reflected back from the target as shown at 30. As hereinbefore indicated slats 19 act as a short to the plane of polarization of magnetron power and allow only a small percentage of the magnetron power to leak back to the crystals to act as the feedthrough magnetron signal. Arrow 31 indicates this vectorially. The vertically polarized transmitter power is of course strongly attenuated thereby isolating the receiver. The horizontally polarized signal received from the target is not attenuated however. The reflected target signal after passing through circular polarizer and depolarizer unit 26 is polarized in the opposite plane to that of the magnetron power vector. That is if the magnetron power vector represented by arrow 25 is vertically polarized, the returning power vector represented in Fig. 1 by arrow 27 will be horizontally polarized and will pass slats 19 without appreciable attenuation. As hereinbefore stated the crystals are connected to both ends of primary 23 of transformer 22, the primary being center-tapped to ground. Amplitude variations in the feedthrough signal are therefore detected in push-push fashion and cancel each other. The returning doppler signal, after beating with the feedthrough, is detected in push-pull fashion and generates a signal on the secondary 24 of transformer 22, output being taken off the secondary 24 at terminals 28 and 29.

Referring to Fig. 2, the relationship between the crystal arms 11 and 12 and the tuning stud 18 with respect to the waveguide and to each other is more clearly shown. Each crystal is set at 45° (degrees) on adjacent corners of the waveguide and can detect either horizontal or vertical polarization. As they are connected as a balanced detector the combination of both crystals is insensitive to amplitude modulation of either polarization. However, the output will contain the beat signal measuring the difference frequency between the two polarizations.

Thus, there is presented an apparatus suitable for waveguide of small dimensions such as X-band waveguide and capable of eliminating spurious variations present in the magnetron output in the feedthrough to the receiving circuit by means of two crystal detectors set on opposite sides of the waveguide and connected to cancel the amplitude variations of the feedthrough.

Obviously many modifications and variations of the present invention are possible in the light of the above teachings. It is therefore to be understood that within the scope of the appended claims the invention may be practiced otherwise than as specifically described.

What is claimed is:

1. A transceiver system comprising ultra-high frequency oscillating means to produce energy polarized in a first direction, antenna means, polarizer and depolarizer means disposed between said oscillating means and said antenna to act on energy transmitted and received by said antenna in a manner such that the received energy is converted to energy that is polarized orthogonal to said first direction, a square waveguide connected to be energized by the received energy, means for substantially shorting the first direction polarized energy allowing some feedthrough signal and almost all of said received energy to pass into said waveguide, balanced detector means connected in said waveguide to cancel amplitude variations in the feedthrough signal and to detect a composite feedthrough and return signal and means connected to said balancing means to convert the detected signal into an output signal.

2. The apparatus of claim 1 wherein said polarizer and depolarizer unit is a circular polarizer and depolarizer, the antenna means thereby transmitting circularly polarized signals and receiving circularly polarized signals reflected from a target, said circular polarizer and depolarizer converting the received circularly polarized signals to effect a return signal power vector in a direction orthogonal to said first direction.

3. The apparatus of claim 2 wherein said balanced detector means comprises a pair of crystal arms set on adjacent 45° corners of the square waveguide.

4. The apparatus of claim 3, said balanced detector means including a tuning stud mounted opposite the two crystal arms to match the reactance of the crystals.

5. The apparatus of claim 4, said shorting means comprising a plurality of slats disposed to selectively block electromagnetic wave energy polarized in the first direction and to pass electromagnetic wave energy polarized in the second direction and wherein said directions are substantially perpendicular to each other.

6. The apparatus of claim 5 wherein said means connected to the balancing means comprises a transformer, said transformer comprising a primary having opposite ends respectively electrically connected to the crystal arms, said primary being center-tapped to ground, and a secondary to generate an output signal.

7. A high frequency electromagnetic energy transmitting and receiving system comprising a waveguide, a circular polarizer and depolarizer unit, an antenna, isolating slats, balanced detector means, a magnetron to produce electromagnetic energy and having a magnetron input arm to inject energy polarized in a first direction into the waveguide, said isolating slats being disposed between said balanced detector means and said arm to isolate the detector from all but a relatively small portion of feedthrough of said first direction polarized energy, the magnetron energy passing through the polarizer and depolarizer unit to the antenna, the antenna ejecting the energy and receiving returned energy after reflection from a target, the returned energy passing through the polarizer and depolarizer unit and emerging as energy polarized in a direction substantially perpendicular to said first direction, said balanced detector means being adapted to detect amplitude variation in the feedthrough signal in a push-push fashion to cancel magnetron amplitude interference and to beat with the returned energy in push-pull fashion, and means to generate a signal which is a function of the returned energy.

8. The apparatus of claim 7 wherein said waveguide is of square cross-sectional configuration.

9. The apparatus of claim 8 wherein said balanced detector means comprises a first crystal set at a 45° angle to a first edge of the waveguide, a second crystal set at a 45° angle to an edge opposite the first edge, the crystals being located in proximity to adjacent corners of the waveguide and a tuning stud mounted opposite the two crystal arms to match the reactance of the crystals.

10. The apparatus of claim 9 wherein said isolating slats are disposed to selectively substantially block electromagnetic wave energy linearly polarized in the first direction and pass electromagnetic wave energy linearly polarized in the second direction.

11. The apparatus of claim 10 wherein said signal generating means comprises a transformer having a center-tapped and grounded primary, the primary having its ends connected to respective ends of the crystals, and a secondary into which an output signal is induced.

12. Radar apparatus for frequencies in the range of the X-band comprising a four-sided waveguide of square cross-sectional configuration, a pair of crystal arms mounted in adjacent corners at one end of the waveguide at a 45° angle with respect to the side of the waveguide and perpendicularly mounted with respect to the crystal arm axes of each other, an output transformer including a center-tapped primary having its ends respectively connected to the crystal arms, the center-tap of the primary being grounded, the transformer having a secondary to generate output signals, an antenna disposed at an end of the waveguide opposite the crystal arm mounted end, a magnetron assembly including a magnetron input arm to generate magnetron power output having a vertically polarized magnetron power vector, magnetron isolating slats disposed between the magnetron input arm and the crystal arms to substantially block power output from the magnetron from leaking back through the feedthrough to the crystal arms except for a relatively small percentage of magnetron power output, a circular polarizer and depolarizer disposed between the magnetron input arm and the antenna, thereby circularly polarizing magnetron power output to cause the antenna to respectively transmit and receive circularly polarized signals ejected from the antenna and reflected from a target, said reflected signals being acted on by the circular polarizer and depolarizer to present a horizontally polarized returning power vector, the isolating slats being disposed to readily pass through the horizontally polarized return signal, amplitude variations in the feedthrough being detected by the crystal arms in push-push fashion to cancel and the return signal beating with the feedthrough and being detected in push-pull fashion to generate a signal on the transformer of the secondary, thereby substantially eliminating magnetron amplitude interference.

References Cited in the file of this patent

UNITED STATES PATENTS

| | | |
|---|---|---|
| 2,362,561 | Katzin | Nov. 14, 1944 |
| 2,550,524 | Braden | Apr. 24, 1951 |
| 2,556,377 | Robertson | June 12, 1951 |
| 2,645,769 | Roberts | July 14, 1953 |